(12) United States Patent
Barth

(10) Patent No.: US 8,924,271 B1
(45) Date of Patent: Dec. 30, 2014

(54) ONLINE LOAN PAYOFF QUOTES

(75) Inventor: Ryan Ray Barth, San Antonio, TX (US)

(73) Assignee: United Services Automobile Association, San Antonio, TX (US)

( * ) Notice: Subject to any disclaimer, the term of this patent is extended or adjusted under 35 U.S.C. 154(b) by 728 days.

(21) Appl. No.: 12/135,428

(22) Filed: Jun. 9, 2008

(51) Int. Cl.
*G06Q 40/00* (2012.01)

(52) U.S. Cl.
CPC ..................... *G06Q 40/00* (2013.01)
USPC ......................................... 705/35

(58) Field of Classification Search
USPC ................................... 705/35–45
See application file for complete search history.

(56) References Cited

U.S. PATENT DOCUMENTS

| | | | |
|---|---|---|---|
| 4,736,294 A | 4/1988 | Gill et al. | |
| 5,699,527 A | 12/1997 | Davidson | |
| 5,878,404 A * | 3/1999 | Stout et al. | 705/38 |
| 6,064,984 A | 5/2000 | Ferguson et al. | |
| 2001/0023414 A1* | 9/2001 | Kumar et al. | 705/35 |
| 2002/0029194 A1 | 3/2002 | Lewis et al. | |
| 2002/0169715 A1 | 11/2002 | Ruth et al. | |
| 2003/0229589 A1* | 12/2003 | Rosenblatt et al. | 705/40 |
| 2003/0236725 A1* | 12/2003 | Hickox et al. | 705/35 |
| 2004/0010419 A1* | 1/2004 | Sinnott | 705/2 |
| 2004/0088247 A1 | 5/2004 | Grant et al. | |
| 2006/0004650 A1* | 1/2006 | Mittenzwei et al. | 705/38 |
| 2007/0011085 A1* | 1/2007 | George et al. | 705/38 |
| 2007/0097655 A1* | 5/2007 | Yampolsky et al. | 361/737 |
| 2007/0106603 A1* | 5/2007 | Whyte et al. | 705/39 |
| 2007/0208641 A1 | 9/2007 | Smith et al. | |
| 2007/0282735 A1 | 12/2007 | Schuebert | |

OTHER PUBLICATIONS

OCWEN Residential Loans FAQ on Payoff Quote Information. Jun. 21, 2006. http://web.archive.org/web/20060621082941/http://www.ocwencustomers.com/residentialloans/csc_payoff_survey.cfm.*
Money-Zine.com's Loan Payoff Calculator. Mar. 19, 2006. http://web.archive.org/web/20060319231227/http://www.money-zine.com/Calculators/Loan-Calculators/Loan-Payoff-Calculator/.*
First Horizon's Online Loan Payoff Quote Information. Jun. 25, 2006. http://web.archive.org/web/20060625222557/http://www.firsthorizon.com/loans.onlineloanpayoffquote.cfm.*
Regions Information on Installment Loan Payoff Information. Nov. 15, 2007. http://web.archive.org/web/20071115112157/http://www.regions.com/self_service/installment_loan_payoff info.rf.*
USA Commercial Mortgage Company Loan Servicing Papers. Jul. 17, 2006. http://web.archive.org/web/20060717065306/http://www.usacapitalcorp.com/news/pdfs/Direct_Lender_+Account_Statement-sample.pdf.*
OCWEN FAQ on Payoff Information. Dec. 1, 2007. http://web.archive.org/web/20071201214932/http://www.ocwencustomers.com/csc_FAQ_payoffinfo.cfm?FAQs=1.*
Lot Pro Auto Loan Payoff Calculator. Dec. 19, 2005. http://web.archive.org/web/20051219152214/http://www.lotpro.com/finance/calculators/auto_loan_payoff.*

(Continued)

*Primary Examiner* — Kambiz Abdi
*Assistant Examiner* — Stephanie M Ziegle
(74) *Attorney, Agent, or Firm* — Edwards Wildman Palmer LLP; Christopher J. Capelli

(57) ABSTRACT

A user may select a payoff date for a loan online, and may receive a corresponding loan payoff quote for that date. Additionally, the user may receive a per diem payoff amount. When a user selects a particular payoff date via a website associated with the lender, the loan payoff quote is calculated and provided to the user via the website, text message, or email.

18 Claims, 5 Drawing Sheets

(56) References Cited

OTHER PUBLICATIONS

Brock and Scott Loan Payoff Request Information. Feb. 5, 2005. http://web.archive.org/web/20070205175355/www.brockandscott.com/bs_foreclosure_sales.php and http://web.archive.org/web/20070206194802/www.brockandscott.com/bs_contact_reinstatement.php.*

Chelsea Groton Bank Servicing Your Loan FAQ. Jul. 14, 2006. http://web.archive.org/web/20060714101229/www.chelseagroton.com/Our_Products_and_Services/Servicing_Your_Loan.html.*

Heureux, Stephen L. et al. "An Options-Based Model for Valuing Commercial Mortgage Loans", Chatham Research Alliance, Mar. 21, 2005, pp. 1-24.

Wells Fargo Online, "Wells Fargo Payoff Statement", 2 pages, Retrieved online [https://online.wellsfargo.com/das/cgi-bin/session.cgi?sessargs=uROxzba93ulRSGg1AWqJ36LLsdleFwmt]. Copyright 1995-2008 Wells Fargo.

Financial Contacts and the Host Database. Princeton University Office of Information Technology. Jul. 3, 2002. http://web.archive.org/web/20020703181012/http://www.net.princeton.edu/hostmaster/fieldInfo/financial-contacts.html.

Anderson, Tyler. XForms Tip: Dealing with dates and time with XForms. IBM. Sep. 29, 2006. http://www.ibm.com/developerworks/xml/library/x-xformstipdatetime/index.html.

Trac Webpage on Email Notification of Ticket Changes. Jul. 15, 2006. http://web.archive.org/web/20060715172516/http://trac.edgewall.org/wiki/TracNotification.

* cited by examiner

ONLINE LOAN PAYOFF QUOTES

BACKGROUND

In finance, a borrower is the party in a loan agreement which receives money from a lender and promises to repay the lender in a specified time referred to as a loan period. A borrower may pay off the loan at any time during the loan period. Typically, if the borrower would like to know the amount needed to pay off the loan on a particular date, the borrower must telephone the lender and speak with a representative of the lender. The representative requests information from the borrower, performs a calculation, and provides the borrower with the payoff amount referred to as a loan payoff quote. This is time consuming for the borrower and the representative and is prone to error.

Some lenders provide loan payoff quotes electronically to a borrower, e.g., via a website, for fixed payoff times, such as 10 days or 30 days in the future. However, lenders do not provide a loan payoff quote online for a borrower-selectable specific number of days. Thus, a precise loan payoff quote for a borrower-selected payoff date cannot be provided online to a borrower, and as a result, a borrower often overpays or underpays when paying off a loan on a borrower-selected payoff date.

SUMMARY

A user may select a payoff date for a loan online, and may receive a corresponding loan payoff quote for that date. Additionally, the user may receive a per diem payoff amount. When a user selects a particular payoff date via a website associated with the lender, the loan payoff quote is calculated and provided to the user via the website, text message, or email, for example.

In an implementation, if the interest rate changes after a user had been provided with an online loan payoff quote for a variable rate loan, the user may be alerted about the interest rate change and may be presented with a new or revised online loan payoff quote.

In an implementation, if the user-selected payoff date passes without the user paying off the loan, the user may be provided with an advisory that the payoff quote has changed.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
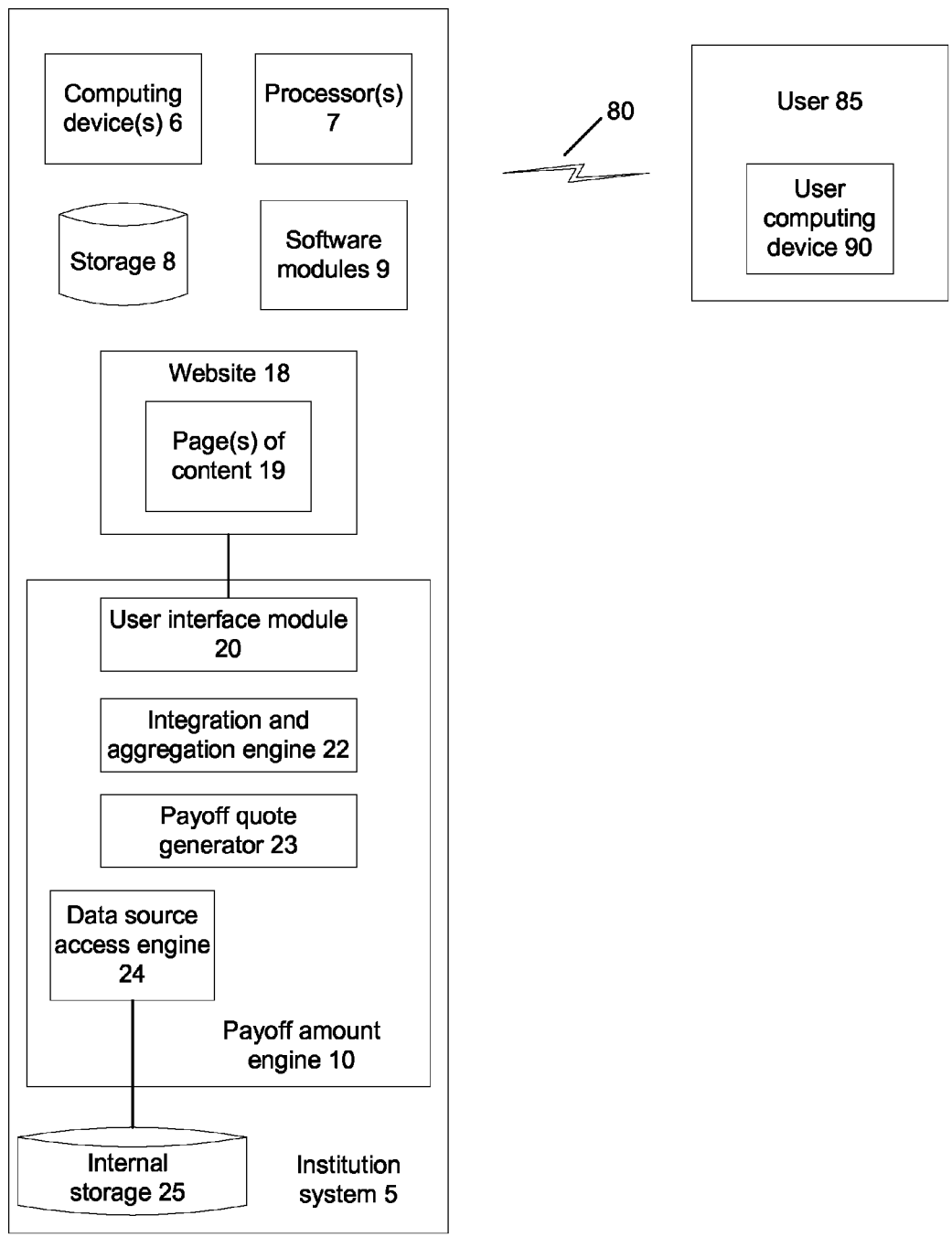
FIG. 1 is a block diagram of an implementation of a system that may be used to provide an online loan payoff quote.

FIG. 1 is a block diagram of an implementation of a system that may be used to provide an online loan payoff quote. An institution system 5, associated with or otherwise maintained by an institution such as a financial services institution, may include a payoff amount engine 10 that may process a loan payoff quote request for a user-selected payoff date, received from a user computing device 90 associated with a user 85. In an implementation, the user 85 may be a borrower, and the institution system 5 may be associated with a lender. The loan may be any type of loan, such as an automobile loan, a home equity loan, a mortgage, a personal loan, etc.

In an implementation, the institution associated with the institution system 5 may have a website 18, such as a financial services website. On the website 18, in a common space, the user 85 may be presented with loan information, financial advice, product recommendations, and/or information pertaining to their accounts.

The user 85 via the user computing device 90 may request an online loan payoff quote for a particular payoff date from the institution system 5. The institution system 5, and in particular the payoff amount engine 10 in an implementation, may retrieve the appropriate data from storage, generate a loan payoff quote for the particular payoff date, and provide the loan payoff quote to the user computing device 90. The user computing device 90 may be a handheld computing device such as a personal digital assistant (PDA) or a mobile phone, for example, or any type of personal computer (PC). An example user computing device 90 is described with respect to FIG. 5.

The payoff amount engine 10 may request and receive information from the user 85 about the loan that the user 85 would like a payoff quote for. The user 85 may provide the requested information via the user computing device 90, such as a website, text message, or email, for example. The payoff amount engine 10 may retrieve information from storage, such as internal storage 25, and use the information in processing the loan payoff quote request and generating the loan payoff quote for the user-selected payoff date. The payoff amount engine 10 may send the loan payoff quote (e.g., over a network 80) to the user 85 via the user computing device 90.

The user computing device 90 and the institution system 5 may be connected over the network 80. It is contemplated that the network 80 may be any type of private or public communication network such as, for example, an intranet, Internet, local area network (LAN), wide area network (WAN), wireless fidelity (WiFi) network, cellular connection, plain old telephone service (POTS), and the like.

The payoff amount engine 10 may analyze, process, and store data pertaining to the user 85, the loan payoff quote request, and the generated loan payoff quote. The data may be stored in internal storage 25 or other storage, perhaps in storage associated with the institution system 5 such as storage 8.

The payoff amount engine 10 may include a user interface module 20, an integration and aggregation engine 22, a payoff quote generator 23, and a data source access engine 24. The user interface module 20 may generate and format one or more pages of content 19 as a unified graphical presentation that may be provided to the user computing device 90 as an output from the payoff amount engine 10. The page(s) of content 19 may be provided to the user computing device 90 via the website 18 associated with the institution system 5. In an implementation, instead of hosting the website 18, the institution system 5 may comprise a conventional application server hosting a proprietary online service accessible only by a private network. In any event, the institution system 5 may have appropriate security mechanisms in place to prevent unauthorized third parties from intercepting the user's information.

The content may be personalized to the user 85, using information retrieved from internal storage 25 or other storage, for example. Personalization may include presentation of the page(s) of content 19 and/or functionality of the page(s) of content 19. For example, a graphical representation displayed on the page(s) of content 19 may be pre-filled with some information pertaining to the user 85, such as name, address, account number(s), loan(s), etc. In an implementation, personalization may be directed to loans that the user may be associated with or responsible for, and may provide specific information on the user's loans, such as amounts, due dates, etc., for example. Personalization is not limited to loans and may be directed to any type of data, information, product, service, advertisement, etc.

In an implementation, the user 85 may use the user interface module 20, for example, to select a loan from which to request a loan payoff quote, select a loan payoff date (e.g., via an online calendar, pull down menu(s), or data input prompt, etc.) from which to request a loan payoff quote, and provide information requested by the institution system 5 to generate a loan payoff quote, for example, via the user computing device 90.

The integration and aggregation engine 22 provides the payoff amount engine 10 the ability to retrieve information from internal storage 25 and any other storage concurrently, in an implementation, via the data source access engine 24. The integration and aggregation engine 22 may receive user data, loan data, rate data, etc. from the data source access engine 24 and may provide that information to the payoff quote generator 23. The payoff quote generator 23 may use tools, calculators, applications, and aggregators, for example to analyze the user data, the loan data, the rate data, etc., to generate a loan payoff quote, a per diem amount, variable loan payoff quotes, and interest savings amounts, for example, described further herein, and may output these quotes and/or amounts. The quotes and/or amounts may be provided via the website 18, text message, and/or via email to the user 85, for example.

In an implementation, one or more quotes and/or amounts may be integrated into a single unified presentation, which may then be sent to the user interface module 20 for presentation to the user 85. Through this mechanism, the user 85 may quickly see the quotes and/or amounts that have been generated for them. Thus, in an implementation, quotes and/or amounts may be provided online, e.g. via the website 18, to the user 85 as described further herein.

The user 85 may interface with the system 5 via the website 18 that may display one or more pages of content 19 to the user 85 on the user computing device 90. A request from the user 85 may be received at the institution system 5 through any suitable means, such as interaction with a web browser that is in communication with the payoff amount engine 10 or other computing device within the institution system 5. The actual mechanism of connection is outside the scope of the present discussion. The request may be processed by the payoff amount engine 10, which then provides the user 85 with a response to the request, e.g., in the form of one or more quotes and/or amounts. Quotes and/or amounts may be generated and exported via the website 18.

The user computing device 90 may provide user 85 access to a system which is coupled to the payoff amount engine 10 and is configured to receive a plurality of user requests, at least one of which is a request for a loan payoff quote for a user-selected date. A system may be configured to format and transmit a graphical user interface to user 85, and through the graphical user interface provide the user 85 with the ability to interact with and manipulate the data provided by the institution system 5.

A user access system may be communicatively coupled to the payoff amount engine 10 and may be configured to send machine-readable instructions to the payoff amount engine 10. Those instructions may cause the payoff amount engine 10 to access storage such as internal storage 25. As mentioned above, the payoff amount engine 10 may provide a unified graphical presentation output. The unified graphical presentation may be transmitted to the user access system. In an implementation, the unified graphical presentation is combined with other materials and transmitted to the user 85. In an implementation, the unified graphical presentation is received by the user access system and transmitted directly to the user 85 without the inclusion of any other materials.

The user access system may be implemented as a web server in an implementation. The user access system, through the use of any suitable interactive web technology, provides an interactive experience to the user 85 through which loan payoff quotes may be requested and received. Any technology that provides interactivity through a web browser is considered to be within the scope of the present discussion and may include, without limitation, Hyper-Text Mark-Up Language (HTML), Dynamic HTML (DHTML), JavaScript, and Ajax.

The institution system 5 may comprise one or more computing devices 6. A user computing device 90 may allow a user 85 to interact with the computing device(s) 6. The computing device(s) 6 may have one or more processors 7, storage 8 (e.g., storage devices, memory, etc.), and software modules 9. The computing device(s) 6, including its processor(s) 7, storage 8, and software modules 9, may be used in the performance of the techniques and operations described herein. Information associated with the user 85 may be stored in storage 8 or other storage such as internal storage 25, for example.

Examples of software modules 9 may include modules for identifying and authenticating a user, generating web page content for display, and receiving requests and instructions from a user, described further herein. While specific functionality is described herein as occurring with respect to specific modules, the functionality may likewise be performed by more, fewer, or other modules. An example computing device and its components are described in more detail with respect to FIG. 5.

Figure 2:
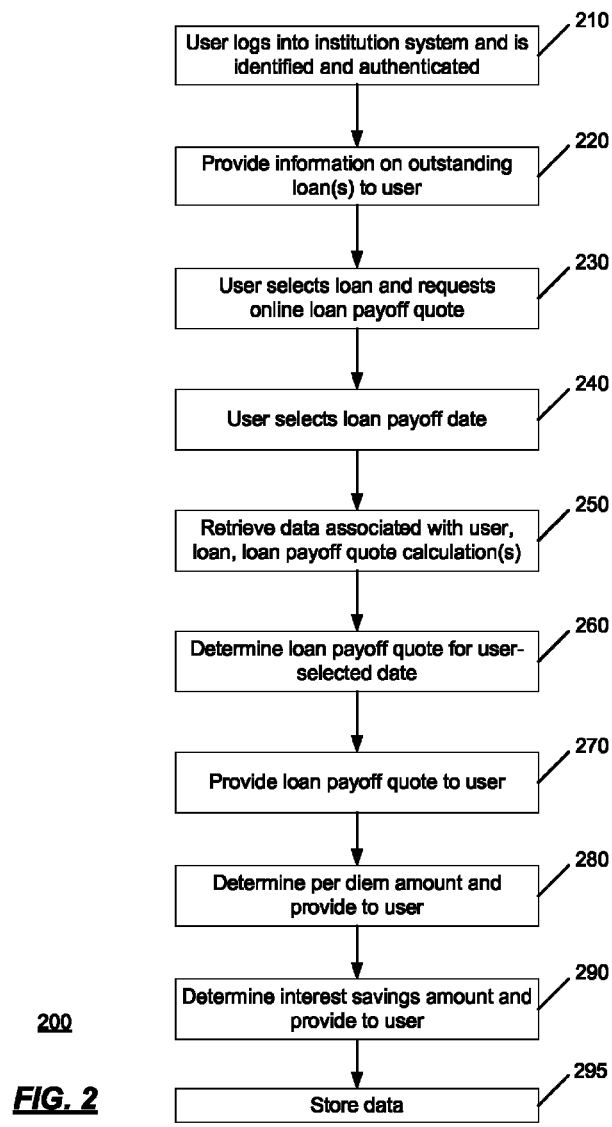
FIG. 2 is an operational flow of an implementation of a method that may be used to provide an online loan payoff quote.

FIG. 2 is an operational flow of an implementation of a method 200 that may be used to provide an online loan payoff quote. At operation 210, a user may log into an institution system, e.g. a website associated with the institution system, and may be identified and authenticated using any known technique(s). Information pertaining to one or more outstanding loans associated with the user may be provided to the user, e.g. via a web page, at operation 220. The user may select a loan and request an online loan payoff quote at operation 230, e.g., by selecting a loan and/or payoff quote button or icon.

Such a selection may take the form of highlighting the button or icon, clicking on the button or icon, or any other known form of selection.

At operation 240, the user may select a loan payoff date e.g., pursuant to a request provided via the institution system (e.g., via the website). In an implementation, the user may select the loan payoff date via an online calendar provided on the website. Alternatively, the user may select the loan payoff date by entering the date at an appropriate data input prompt on the website.

At operation 250, the institution system may retrieve data associated with the user and the loan, along with any other data that may be used in determining a loan payoff quote, per diem amount, and/or interest savings amount, for example. In an implementation, the user does not have to provide any information after selecting the loan and the payoff date in order to have an online loan payoff quote generated and provided to them. At operation 260, the institution system may determine the loan payoff quote for the user-selected date based on the retrieved data. The loan payoff quote may be provided to the user via the website, email, text message, facsimile, telephone, etc., at operation 270. Any known technique for calculating an amount of a loan payoff (i.e., a loan payoff quote) may be used.

In an implementation, a per diem amount may also be determined and provided to the user at operation 280. This is the amount that the loan is costing the user each day. Additionally or alternatively, an amount of interest over the lifetime of the loan that the user may save by paying off the loan on the user-selected date may be determined and provided to the user at operation 290. At operation 295, the institution system may store the data it has received from the user and/or the data is has determined or calculated and provided to the user.

Some loans may be variable rate (also known as floating rate) such that their interest rate varies to reflect market conditions. With these types of loans, the interest rate will normally vary with changes to a base rate. In an implementation, for a variable rate loan, known, expected, estimated, and/or potential changes to the interest rate that may occur before the user-selected payoff date may be taken into account when determining the loan payoff quote for the user-selected date. Such information may be provided to the user, for example, along with the online loan payoff quote.

In an implementation, if the interest rate changes after a user had been provided with an online loan payoff quote for a variable rate loan, the user may be alerted about the interest rate change and may be presented with a new or revised online loan payoff quote.

Figure 3:
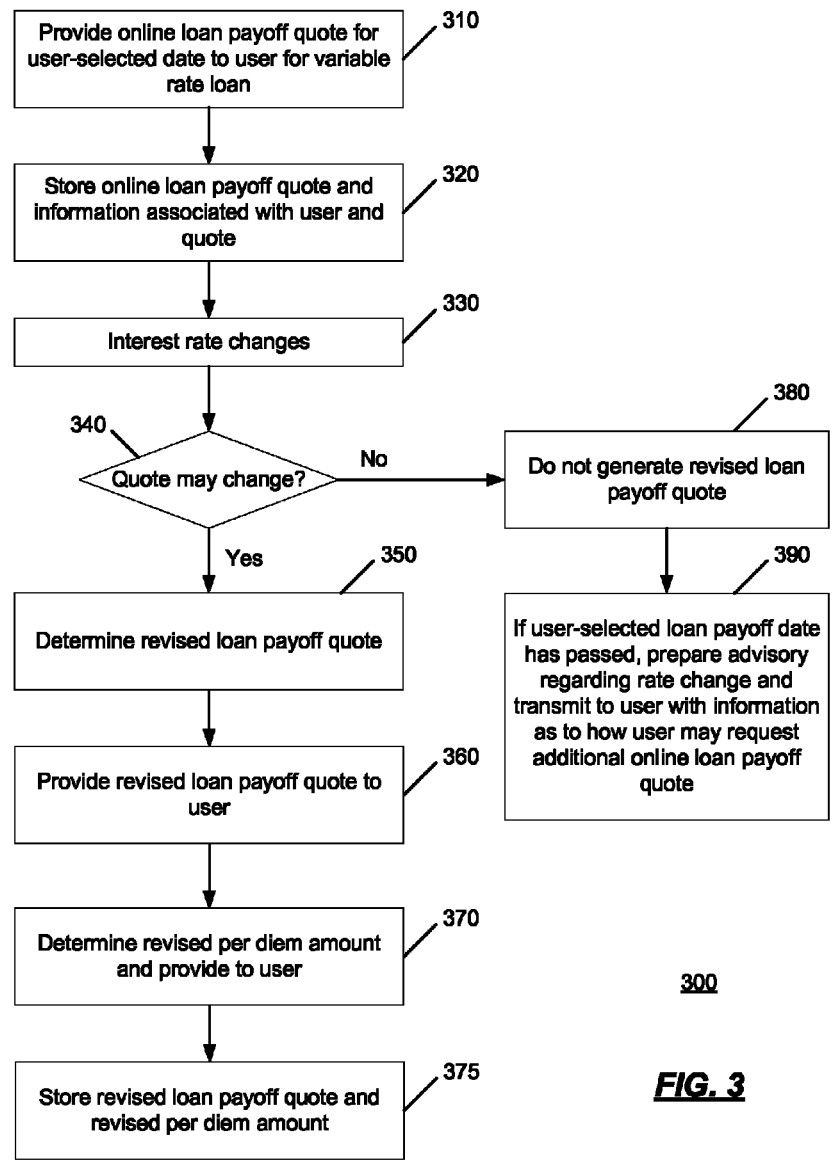
FIG. 3 is an operational flow of an implementation of a method that may be used to provide an online loan payoff quote for a variable rate loan.

FIG. 3 is an operational flow of an implementation of a method 300 that may be used to provide an online loan payoff quote for a variable rate loan. At operation 310, the institution system provides an online payoff quote for a variable rate loan to a user. In an implementation, the institution system may provide a per diem amount for a variable rate loan to the user. The institution system may store the online loan payoff quote, the per diem amount, and other information associated with the user and/or the quote in storage, at operation 320. The other information may include user contact information such as email address, text message address, telephone number, facsimile number, etc., and may include the rate that the online payoff quote and per diem amount were based on.

At operation 330, the interest rate on the variable rate loan may change, e.g., because the base rate underlying the variable rate loan may change. A notification may be received at the institution system that the interest rate may change. At operation 340, the institution system may determine if the online loan payoff quote and per diem amount that had been provided to the user may change based on, or is otherwise affected by, the interest rate change. In an implementation, the institution system may retrieve the information from storage associated with the quote and the user, and compare the rate that the online loan payoff quote and per diem amount were based on with the changed interest rate. The institution system may check to determine if the user has already paid off the loan. The institution system may also check the date of the online loan payoff date that had been user-selected to determine if the payoff date had passed prior to the interest rate change.

If the loan is still open (i.e., has not been paid off) and if the online loan payoff quote and per diem amount that had been provided to the user may change based on the interest rate change, at operation 350, the institution system may determine a revised loan payoff quote for the user-selected date based on the retrieved data. Any known technique for calculating or determining a loan payoff quote may be used. A revised loan payoff quote may be provided to the user, e.g., via the user contact information that may be retrieved from storage, at operation 360. The revised loan payoff quote may be sent to the user via a website link, email, text message, facsimile, telephone, etc. In an implementation, a revised per diem amount may also be determined and provided to the user at operation 370. The revised loan payoff quote and the revised per diem amount may be stored by the institution system at operation 375.

If the online loan payoff quote and per diem amount that had been provided to the user does not change based on, or is not affected by, the interest rate change, e.g., because the user-selected payoff date has passed, because the loan is unaffected by the interest rate change, etc., a revised loan payoff quote may not be generated and processing may end at operation 380. In an implementation, at operation 390, if the user-selected payoff date has passed, the institution system may prepare an advisory regarding the rate change and transmit the advisory to the user along with information as to how the user may request an additional online loan payoff quote.

Figure 4:
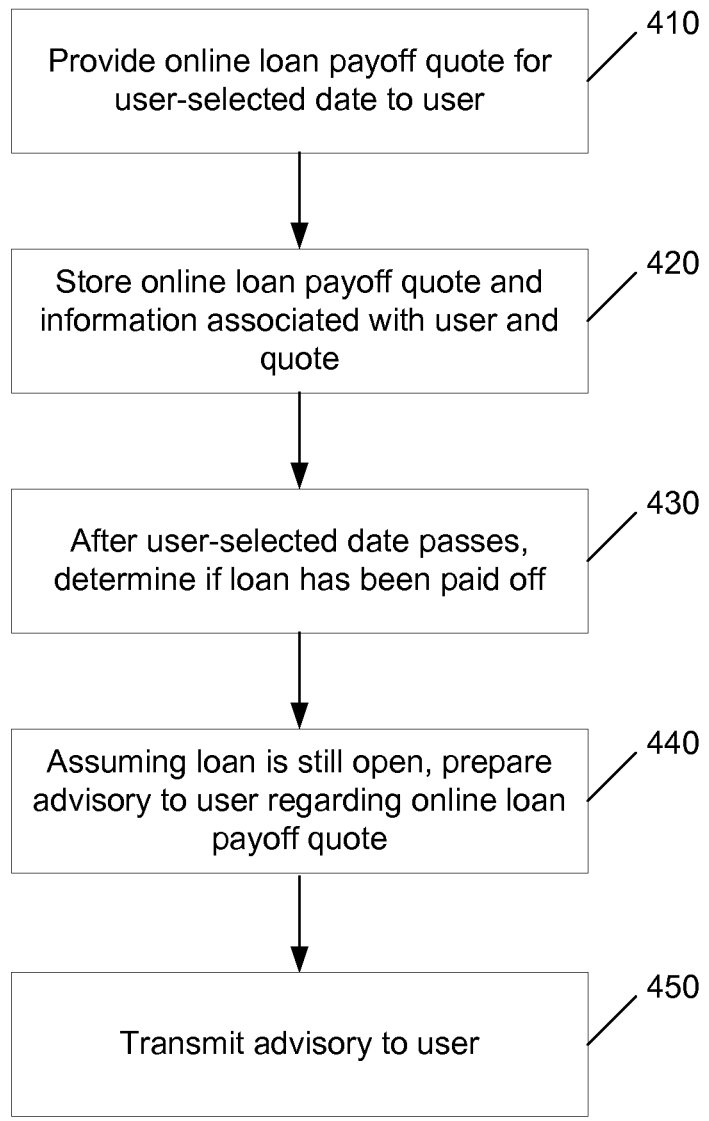
FIG. 4 is an operational flow of an implementation of a method that may be used to provide a user with an advisory regarding an online loan payoff quote.

If the payoff date passes without the user paying the loan off, the user may be provided with a reminder advising them that the payoff quote has changed. FIG. 4 is an operational flow of an implementation of a method 400 that may be used to provide a user with an advisory regarding an online loan payoff quote. At operation 410, the institution system provides an online loan payoff quote to a user. In an implementation, the institution system may provide a per diem amount for the loan to the user.

The institution system may store the online loan payoff quote, the per diem amount, and other information associated with the user and/or the quote in storage, at operation 420. The other information may include user contact information such as email address, text message address, telephone number, facsimile number, etc., and may include the user-selected payoff date that the online loan payoff quote and per diem amount were based on.

At operation 430, after the user-selected payoff date for which the online loan payoff quote was provided passes, the institution system may determine if the loan has been paid off. Such a determination may be made based on the information associated with the user and/or quote that had been stored and may be subsequently retrieved.

Assuming the loan is still open (i.e., has not been paid off), at operation 440, the institution system may prepare an advisory regarding online loan payoff quote that had been previously provided to the user and transmit the advisory to the user using retrieved user contact information at operation 450. The advisory may comprise a reminder about the outstanding loan and the previously provided online loan payoff quote, and may note that the previously provided online loan payoff quote has expired and is no longer accurate. The advisory may tell the user that the loan payoff quote has changed and may comprise information as to how the user may request a revised online loan payoff quote for another user-selected payoff date. In an implementation, the information provided to the user may contain a link to a website that may generate an online loan payoff quote for a user-selected payoff date.

Exemplary Computing Arrangement

Figure 5:
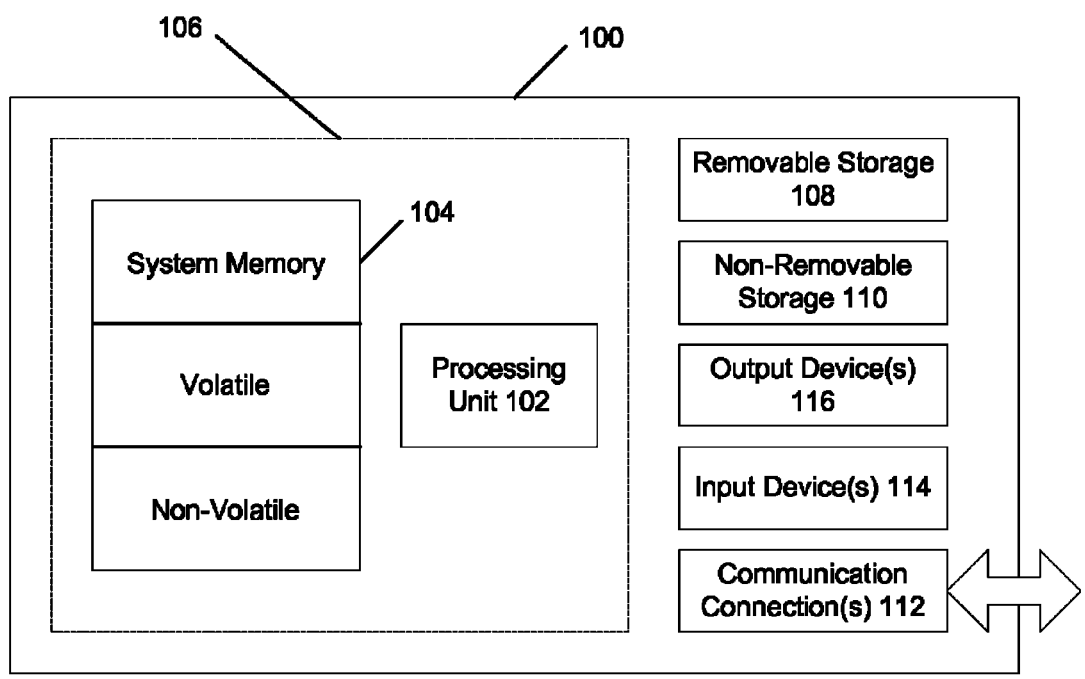
FIG. 5 is a block diagram of an example computing environment in which example embodiments and aspects may be implemented.

FIG. 5 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 100. In its most basic configuration, computing device 100 typically includes at least one processing unit 102 and system memory 104. Depending on the exact configuration and type of computing device, system memory 104 may be volatile (such as random access memory (RAM)), non-volatile (such as read-only memory (ROM), flash memory, etc.), or some combination of the two. This most basic configuration is illustrated in FIG. 5 by dashed line 106.

Computing device 100 may have additional features and/or functionality. For example, computing device 100 may include additional storage (removable and/or non-removable) including, but not limited to, magnetic or optical disks or tape. Such additional storage is illustrated in FIG. 5 by removable storage 108 and non-removable storage 110.

Computing device 100 typically includes a variety of computer-readable media. Computer-readable media can be any available media that can be accessed by computing device 100 and includes both volatile and non-volatile media, and removable and non-removable media. By way of example, and not limitation, computer-readable media may comprise computer storage media and communication media.

Computer storage media include volatile and non-volatile, and removable and non-removable media implemented in any method or technology for storage of information such as computer-readable instructions, data structures, program modules or other data. System memory 104, removable storage 108, and non-removable storage 110 are all examples of computer storage media. Computer storage media include, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100.

Computing device 100 may also contain communication connection(s) 112 that allow the computing device 100 to communicate with other devices. Communication connection(s) 112 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 100 may also have input device(s) 114 such as a keyboard, mouse, pen, voice input device, touch input device, etc. Output device(s) 116 such as a display, speakers, printer, etc. may also be included. All these devices are well known in the art and need not be discussed at length here.

Computing device 100 may be one of a plurality of computing devices 100 inter-connected by a network. As may be appreciated, the network may be any appropriate network, each computing device 100 may be connected thereto by way of communication connection(s) 112 in any appropriate manner, and each computing device 100 may communicate with one or more of the other computing devices 100 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program (s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A non-transitory computer-readable medium comprising computer-readable instructions for providing an online loan payoff quote, said computer-readable instructions comprising instructions that when executed by a processor of a computer, cause the processor to:
   receive a user-selected payoff date for paying off a loan associated with an interest rate, from a user computing device via a website;
   determine a loan payoff quote for the loan including a per diem amount based on the user-selected payoff date;
   provide the loan payoff quote and the per diem amount to the user computing device;
   receive a notification that the interest rate has changed;
   determine, in response to the interest rate changing, a revised loan payoff quote and a revised per diem amount;
   determine, based upon data comparison, if the revised loan payoff quote and the revised per diem amount is different than the loan payoff quote and the per diem amount provided to the user computing device;
   provide, in response to the revised loan payoff quote and the per diem amount being different than the loan payoff quote and the per diem amount, the revised loan payoff quote and the revised per diem amount to the user computing device or maintain the loan payoff quote and the per diem amount if the loan payoff quote and the per diem amount are not different than the revised loan payoff quote and the revised per diem amount;
   determine whether the user-selected payoff date has passed without the user paying off the loan;
   provide, in response to the user-selected payoff date having passed without the user paying off the loan, a reminder to the user stating that the loan payoff quote or the revised payoff quote has expired; and
   provide, in response to the user-selected payoff date having passed with the user paying off the loan, information that no amount is due.

2. The computer-readable medium of claim 1, wherein the instructions that provide the loan payoff quote to the user computing device comprise instructions that provide the loan payoff quote to the user computing device via the website.

3. The computer-readable medium of claim 2, further comprising instructions that provide the interest savings amount to the user computing device via the website.

4. The computer-readable medium of claim 1, wherein the instructions that provide the loan payoff quote to the user computing device comprise instructions that provide the loan payoff quote to the user computing device via an email or a text message.

5. The computer-readable medium of claim 1, further comprising instructions that retrieve data associated with the loan and a user of the user computing device from storage.

6. The computer-readable medium of claim 5, wherein the loan payoff quote is determined without any additional information provided by the user after the user-selected payoff date is received.

7. A method of providing an online loan payoff quote, comprising:
   receiving a user-selected payoff date for paying off a loan associated with an interest rate, at a payoff amount engine of an institution system from a user computing device via a website associated with the institution system;
   determining, by a payoff quote generator of the payoff amount engine, a loan payoff quote for the loan including a per diem amount based on the user-selected payoff date;
   providing the loan payoff quote and the per diem amount to the user computing device by the institution system;
   receiving a notification that the interest rate has changed;
   determining, by the institution system in response to the interest rate changing, a revised loan payoff quote and a revised per diem amount;
   determining, based upon data comparison, if the revised loan payoff quote and the revised per diem amount is different than the loan payoff quote and the per diem amount provided to the user computing device;
   providing, in response to the revised loan payoff quote and the revised per diem amount being different than the loan payoff quote and the per diem amount, the revised loan payoff quote and the revised per diem to the user computing device or maintaining the loan payoff quote and the per diem amount if the loan payoff quote and the per diem amount are not different than the revised loan payoff quote and the revised per diem amount;
   determining whether the user-selected payoff date has passed without the user paying off the loan;
   providing, in response to the user-selected payoff date having passed without the user paying off the loan, a reminder to the user stating that the loan payoff quote or the revised payoff quote has expired; and
   providing, in response to the user-selected payoff date having passed with the user paying off the loan, information that no amount is due.

8. The method of claim 7, wherein providing the loan payoff quote to the user computing device comprises providing the loan payoff quote to the user computing device via the website.

9. The method of claim 8, further comprising providing the interest savings amount to the user computing device via the website.

10. The method of claim 7, wherein providing the loan payoff quote to the user computing device comprises providing the loan payoff quote to the user computing device via an email or a text message.

11. The method of claim 7, further comprising retrieving data associated with the loan and a user of the user computing device from storage.

12. The method of claim 11, wherein the loan payoff quote is determined without any additional information provided by the user after receiving the user-selected payoff date.

13. A system for providing an online loan payoff quote, comprising:
a memory having computer-executable instructions stored thereon and executable by a processor to:
receive a user-selected payoff date for paying off a loan associated with an interest rate from a user computing device via a website;
determine a loan payoff quote for the loan including a per diem amount based on the user-selected payoff date;
provide the loan payoff quote and the per diem amount to the user computing device;
receive a notification that the interest rate has changed;
determine, in response to the interest rate changing, a revised loan payoff quote and a revised per diem amount;
determine, based upon data comparison, if the revised loan payoff quote and the revised per diem amount is different than the loan payoff quote and the per diem amount provided to the user computing device;
provide, in response to the revised loan payoff quote and the per diem amount being different than the loan payoff quote and the per diem amount, the revised loan payoff quote and the revised per diem amount to the user computing device or maintain the loan payoff quote and the per diem amount if the loan payoff quote and the per diem amount are not different than the revised loan payoff quote and the revised per diem amount;
determine whether the user-selected payoff date has passed without the user paying off the loan;
provide, in response to the user-selected payoff date having passed without the user paying off the loan, a reminder to the user stating that the loan payoff quote or the revised payoff quote has expired; and
provide, in response to the user-selected payoff date having passed with the user paying off the loan, information that no amount is due.

14. The system of claim 13, further comprising computer-executable instructions stored on the memory and executable by the processor to provide the loan payoff quote to the user computing device via the website.

15. The system of claim 14, further comprising computer-executable instructions stored on the memory and executable by the processor to provide the interest savings amount to the user computing device via the website.

16. The system of claim 13, further comprising computer-executable instructions stored on the memory and executable by the processor to provide the loan payoff quote to the user computing device via an email or a text message.

17. The system of claim 13, further comprising computer-executable instructions stored on the memory and executable by the processor to retrieve data associated with the loan and a user of the user computing device from storage.

18. The system of claim 17, wherein the loan payoff quote is determined without any additional information provided by the user after the user-selected payoff date is received.

* * * * *